US005709284A

United States Patent [19]
Shultz, Sr.

[11] Patent Number: 5,709,284
[45] Date of Patent: Jan. 20, 1998

[54] ADAPTER FOR INJECTING VISCOUS MATERIAL INTO SMALL OPENINGS AND CAVITIES

[76] Inventor: William E. Shultz, Sr., 239 North Main St., Lombard, Ill. 60148

[21] Appl. No.: 770,135

[22] Filed: Dec. 19, 1996

[51] Int. Cl.$^6$ .................................................... F16C 1/24
[52] U.S. Cl. ...................... 184/5.1; 184/105.1; 222/386
[58] Field of Search ..................... 184/5.1, 105.1, 184/105.2; 141/357; 222/386

[56] References Cited

U.S. PATENT DOCUMENTS

| | | | |
|---|---|---|---|
| 2,160,214 | 5/1939 | Jackson | 184/5.1 |
| 2,438,128 | 3/1948 | Poyner | 184/5.1 |
| 2,699,839 | 1/1955 | Hamel | 184/5.1 |
| 2,710,669 | 6/1955 | Monger . | |
| 2,729,305 | 1/1956 | Hamel | 184/5.1 |
| 3,724,596 | 4/1973 | Freda . | |
| 4,027,929 | 6/1977 | Huddleston . | |
| 4,113,059 | 9/1978 | Markovski . | |
| 4,168,766 | 9/1979 | Shultz . | |
| 4,345,667 | 8/1982 | Shultz . | |
| 4,355,702 | 10/1982 | Shultz . | |
| 4,405,035 | 9/1983 | Shultz . | |
| 5,080,198 | 1/1992 | Rice | 184/105.1 |
| 5,230,226 | 7/1993 | Saarikettu . | |
| 5,303,800 | 4/1994 | Persson . | |
| 5,423,399 | 6/1995 | Smith et al. . | |

FOREIGN PATENT DOCUMENTS 947149  9/1975  Canada ................................. 184/5.1

*Primary Examiner*—Thomas E. Denion
*Attorney, Agent, or Firm*—Marshall, O'Toole, Gerstein, Murray & Borun

[57] ABSTRACT

A device for lubricating bearings and the like including a housing for containing a lubricant, and a movable piston adapted to be inserted into the housing in contact with said lubricant. The piston includes an upper concave surface, for communication of the lubricant with a bearing to be lubricated, and a passage for flow of lubricant. Compression of the piston against the lubricant causes flow of lubricant from below the piston to above the piston. An adapter, or volume-filling means, is disposed on the upper piston surface for filing a portion of a volume defined between the upper, concave piston surface and the wheel bearing. The volume-filling means includes lubricant flow passages for allowing lubricant to flow from said upper concave piston surface to the wheel bearing.

16 Claims, 4 Drawing Sheets

ADAPTER FOR INJECTING VISCOUS MATERIAL INTO SMALL OPENINGS AND CAVITIES

FIELD OF THE INVENTION

The present invention relates to a new adapter that can used in conjunction with a method and apparatus used for injecting viscous materials into narrow openings and cavities, such as wheel bearings. More particularly, the present invention relates to an adapter used in conjunction with a simple tool for injecting grease. This adapter minimizes excess grease from being consumed while using the tool to inject grease into a wheel bearing assembly.

BACKGROUND OF THE INVENTION

Vehicle wheel bearings are disposed around vehicle axles and include a plurality of rollers or bearings to permit relatively frictionless rotation of wheels about the axles. Periodically, these rollers must be lubricated with a very viscous lubricant, commonly called wheel bearing grease. Wheel bearings generally include an inner, or axle-contacting cylindrical member and a concentric, outer cylindrical member of larger diameter, which surrounds, is spaced apart from, and is connected to the inner cylindrical member by a plurality of intermediate rollers or bearings. The rollers or bearings protrude, both below and above the outer cylindrical portion of the wheel bearing, so that the outermost periphery of the bearings are adapted to contact an inner portion of the wheel for rotating movement. The space provided by the rollers or bearings between the inner cylindrical portion of the wheel bearing must be lubricated periodically in addition to lubricating the exposed portions of the rollers or bearings to provide for relatively frictionless continuous rotation of these rollers or bearings during use. Accordingly, it is essential to inject wheel bearing grease between the inner and outer cylindrical wheel bearing members to provide for sufficient lubrication of the rollers during wheel rotation to prevent these rollers from freezing or locking up during vehicle movement. The space between the inner and outer cylindrical members of a wheel bearing is generally very narrow, on the order of $1/32$ inch to $1/4$ inch, and the injection of wheel bearing grease is further difficult because the rollers or bearings are disposed between the inner and outer cylindrical members, making the volume remaining for grease injection between the cylindrical members very small. Further, wheel bearing grease is very viscous, making it quite difficult to inject such material into small spaces.

The present invention is used in conjunction with a method and apparatus for injecting viscous materials into narrow openings and cavities, such as between gaps surrounding rollers of wheel bearings. This apparatus forces grease into small spaces or apertures between adjacent rollers or bearings. The apparatus includes a cylindrical grease receptacle. A piston, containing one or more apertures for upward flow of grease, is placed over the grease receptacle in contact with an upper surface of the grease. The top of the piston includes a concave or tapered surface. Upon application of pressure, grease flows through apertures in the piston and contacts the wheel bearing.

Prior to the present invention, a wheel bearing was placed directly on the piston. When pressure was applied, the grease flowed through the narrow wheel bearing openings and cavities from the undersurface of the piston to the wheel bearing. Although the bearing was adequately greased, a significant amount of grease collected in the space located underneath the wheel bearing and on top of the concave piston surface. Because of the shape of the wheel bearing and the concave upper surface of the piston, a void space would always be present where a significant amount of unused grease collected and was thus wasted. The bigger the bearing, the more wasted grease.

The present invention provides an adapter that fits in the empty space between the wheel bearing and the upper concave piston surface. Thus, less grease is consumed when a wheel bearing is greased.

DESCRIPTION OF THE PRIOR ART

The following U.S. patents disclose an apparatus for injecting grease: U.S. Pat. Nos. 4,168,766 Shultz; 4,345,667 Shultz; 4,355,702 Shultz; 4,405,035 Shultz; 2,710,669 Monger; 3,724,596 Freda; 4,027,929 Huddleston; 4,113,059 Markovski; 5,230,226 Saarikettu; 5,303,800 Persson; 5,423,399 Smith, all of which are hereby incorporated by reference. The adapter of the present invention is useful with all of the devices disclosed in these prior art patents.

None of the injecting devices described in the above-identified patents disclose or suggest the use of a volume-filling means capable of preventing excess grease from accumulating under a wheel bearing during lubrication of the bearing.

SUMMARY OF THE INVENTION

One aspect of the present invention is to provide a new and improved method and apparatus for efficiently greasing or lubricating an article having a grease-receiving slot, such as a wheel bearing.

Another aspect of the present invention is to provide an adapter for lubricating apparatus which prevents excess grease from being accumulated adjacent a wheel bearing while greasing the wheel bearing.

Another aspect of the present invention is to provide a volume-filling means that includes a plurality of interfitting pieces that are separable for filling a plurality of different volumes adjacent wheel bearings of various sizes.

In brief, the present invention relates to an adapter used in a method and apparatus for injecting a viscous material, such as a lubricant and, particularly, wheel bearing grease, into small apertures such as those existing in vehicle wheel bearings. The lubricating apparatus useful with the adapter of the present invention includes a housing defining an internal grease-containing chamber, including an open, piston-receiving end. A viscous material or lubricant, such as wheel bearing grease, is disposed within the housing, and a piston is inserted within the housing to sealingly engage interior walls of the housing. The piston is slidably mounted within the chamber for vertical movement and, in the preferred embodiment, includes a plurality of apertures surrounding a threaded central stem. The stem is threadedly and centrally attached to the piston and in an alternate embodiment, provides a passage for the escape of grease from the housing or grease chamber to an upper piston surface.

In the preferred embodiment, the piston includes a plurality of openings surrounding the stem for the passage of grease from the housing or grease chamber to the upper surface of the piston as the piston is forced down into the housing or chamber against the lubricant, while maintaining peripheral, sealing contact with the interior housing walls. The annular adapter is placed over the central upstanding stem of the piston. The convex shape of the adapter, shaped complementary to the concave upper surface of the piston, allows the adapter to fit securely in contact with the upper, concave surface of the piston. The wheel bearing is then placed over the adapter and the central upstanding stem of the piston. The cylindrical portion of the adapter fits securely within a central access opening in the interior of the wheel bearing. The outer periphery of the wheel bearing further forms a seal with the tapered bearing-contacting upper surface of the piston. Accordingly, the tapered upper surface of the piston creates a continuous seal completely around the outer cylindrical periphery of the wheel bearing. The grease flows upwardly through the openings in the piston, emerging from the piston apertures, and flows to the interior of the wheel bearing when the piston is squeezed by hand against the upper surface of the lubricant.

The apparatus further includes a tapered or conical spool adapted to engage and seal the wheel bearing completely around an interior edge of the inner cylindrical wheel bearing member that defines the wheel bearing central access opening. The tapered spool is inserted into the central access opening of the wheel bearing such that the outer tapered spool surface sealingly engages an interior annular surface of the inner cylindrical wheel bearing member. The spool surface fits not only within the wheel bearing, but also within a concave, or downwardly and inwardly tapered, inner surface of the adapter. The spool prevents the grease emerging from the upper surface of the piston from escaping through the central wheel bearing access opening, and thereby causes the grease to follow its only path of escape between the inner and outer cylindrical wheel bearing members. The spool includes a rounded, distal end, for engagement by an operator's hand or a vice jaw, to compress the piston against the grease. Compression of the spool, and thereby compression of the piston, slidably mounted within the housing, will force the grease from the housing or grease chamber through the central opening of the piston, out the aperture in the piston stem, and between the inner and outer cylindrical wheel bearing members.

The central piston stem cooperates with the tapered spool to centrally align the wheel bearing during operation of the apparatus to assure a uniform distribution of grease throughout the entire annular slot between the inner and outer cylindrical wheel bearing portions. During operation of the apparatus, the grease emerges from between wheel bearing rollers as continuous ribbons or bands of grease, emerging at substantially the same time and having substantially equal lengths, thereby illustrating and evidencing uniform distribution of the grease to the wheel bearings. When the grease has emerged from between each of the rollers or bearings, as seen through the transparent or translucent housing, the operator of the apparatus knows that the greasing or packing operation has been successfully completed.

In accordance with an important feature of the present invention, an adapter is used in conjunction with the above-described lubricating apparatus for injecting grease to minimize the use of excess grease when the apparatus is in use. A truncated cone shape of the adapter allows it to fit securely on the upper concave surface of the piston, or slightly above the upper surface of the piston. Because of the secure fit of the adapter against the upper concave piston surface, or spaced closely adjacent thereto, grease does not pool substantially in void spaces within the apparatus. The use of the adapter therefore reduces the quantity of grease used for each lubricating operation. In the preferred embodiment, the adapter occupies at least about 50%, preferably at least about 75%, more preferably about 80–95%, of a volume defined vertically below the wheel bearing, vertically above the upper surface of the piston, and surrounding the central stem.

BRIEF DESCRIPTION OF THE DRAWINGS

FIG. 1b is a cross-sectional view taken through lines 1b–1b of FIG. 1a.

FIG. 3a is a cross-sectional view of a piston portion of the lubrication apparatus of the present invention.

DESCRIPTION OF THE PREFERRED EMBODIMENT

Figure 3:
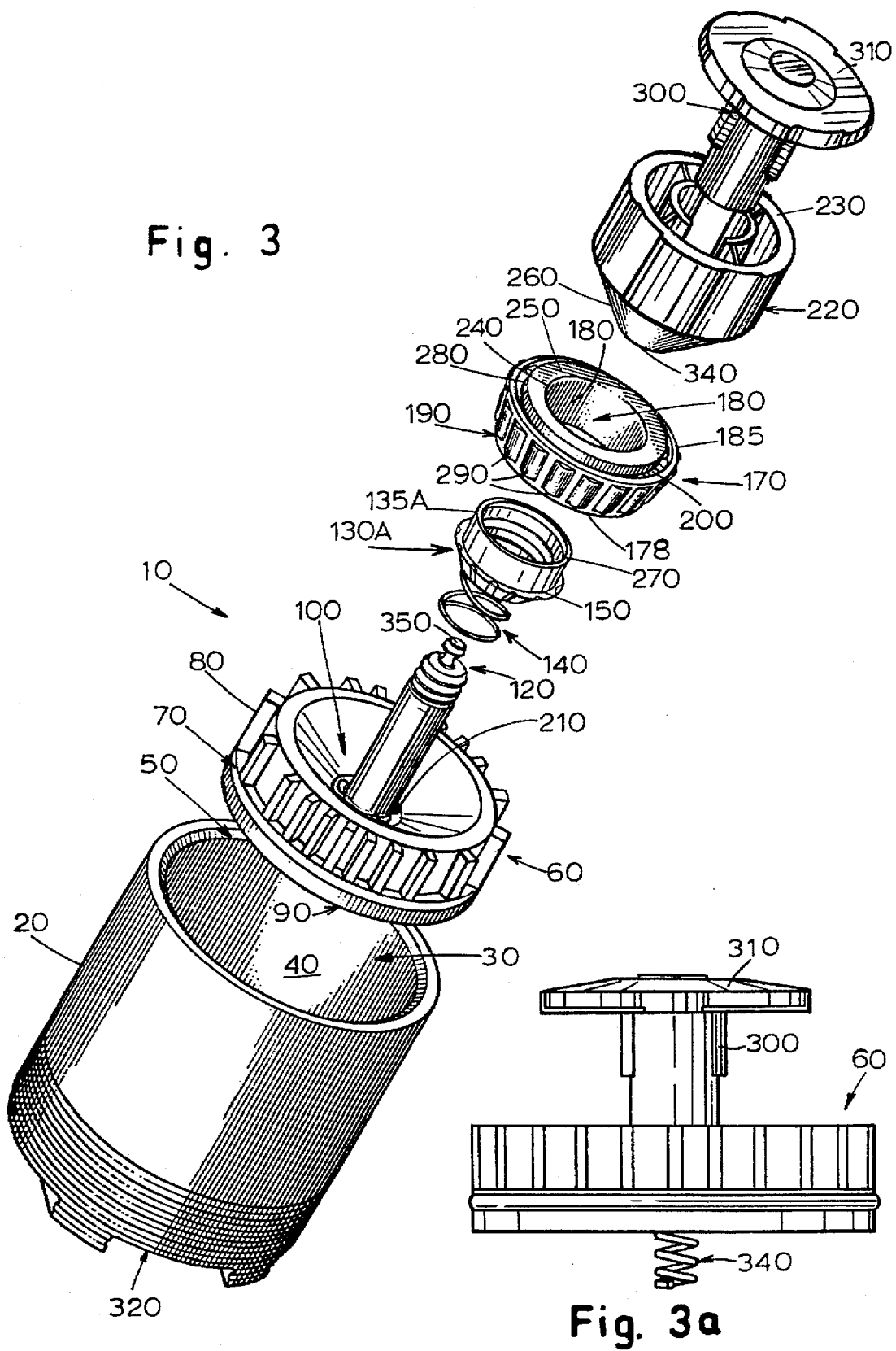
FIG. 3 is an exploded perspective view of the adapter in the preferred lubricating apparatus during lubrication of a wheel bearing.

With reference to the drawings, and initially to FIG. 3, there is illustrated an apparatus, generally designated by the reference numeral 10, for injecting grease or other viscous material into one or more slots or apertures of an annular device, such as a wheel bearing. In particular, this apparatus may be used to grease, or pack with lubricant, an article such as a wheel bearing used on a wheel of an automobile or other vehicle. The apparatus 10 forces grease into small spaces or apertures between adjacent spaced rollers or bearings, forming part of a vehicle wheel bearing assembly. The apparatus 10 is a low-cost device that can be used by hand by mechanics and others who do not have access to more expensive greasing equipment. The lubricating apparatus of the present invention can be operated by hand, or with a simple vice, to provide the necessary compressive forces to cause grease to flow through the piston and into narrow spaces surrounding rollers or bearings in a wheel bearing assembly that is operatively mounted on the upper, concave piston surface.

The apparatus 10 includes a cylindrical grease receptacle or housing 20, having an annular interior wall 30 which defines a generally cylindrical interior grease-containing chamber 40, having an open, piston-receiving end 50. The apparatus 10 further includes a piston, indicated generally by reference numeral 60, that is movably mounted within the grease-containing chamber 40, in contact with an upper surface of the contained grease. The piston 60 includes a peripheral O-ring or sealing ring 70 for creating a seal between an outer peripheral surface 80 of the piston 60 and the interior housing wall 30. The piston 60 includes a lower, grease-contacting, generally planar surface 90, and an upper, dished, or generally concave or tapered surface 100, preferably having an included angle of 80°–160 degrees.

The piston 60 includes a central, threaded aperture 110 for receiving an upwardly extending threaded stem 120. An annular adapter, or volume-filling means, 130A is placed on the concave or tapered upper piston surface 100 over the stem 120. In the preferred embodiment, the adapter 130A has an integral spring 140 extending downwardly from its lowermost surface for lifting the adapter 130A from the concave upper piston surface 100 upon completion of the lubricating operation and, particularly for maintaining sealing pressure of the adapter 130 against an undersurface 178 of the wheel bearing. A base 144A and/or 144B (FIG. 1) of the adapter is annular and convex or tapered downwardly and inwardly. This enables the base 144A and/or 144B of the adapter to fit securely against, or closely spaced above, the upper concave or tapered surface 100 of the piston 60. The outer surface of base 144A and/or 144B of the adapter further contains a plurality of spaced grooves 150 extending radially from a central opening 152 to an outer, annular periphery 154 of base 144 (see FIG. 2). The grooves 150 provide passages for the grease to travel under the base 144A (FIG. 2) of the adapter 130A from the central opening 152 to the bearing 170. The adapter can be constructed in various sizes to adapt to different size bearings.

Figure 1:
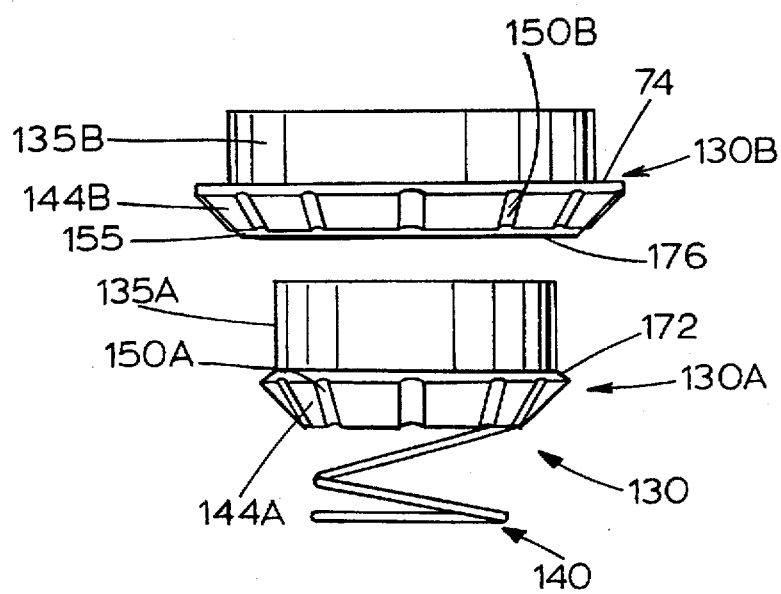
FIG. 1 is an exploded view of the adapter shown in two interfitting parts for lubrication of wheel bearings of different sizes.
Figure 1A:
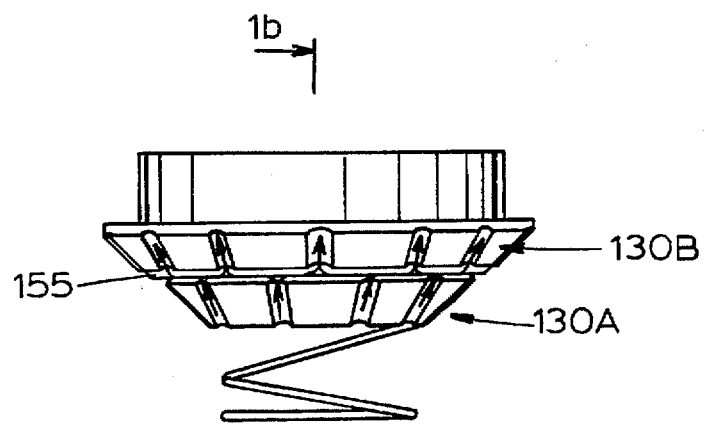
FIG. 1a is a front view of the adapter of FIG. 1, assembled for lubrication of a relatively large wheel bearing.
Figure 1B:
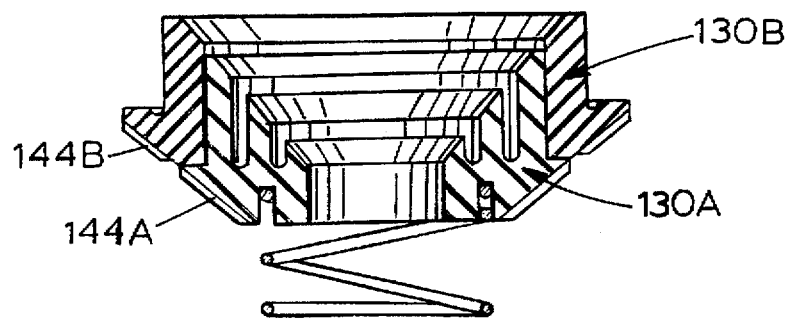
Figure 2:
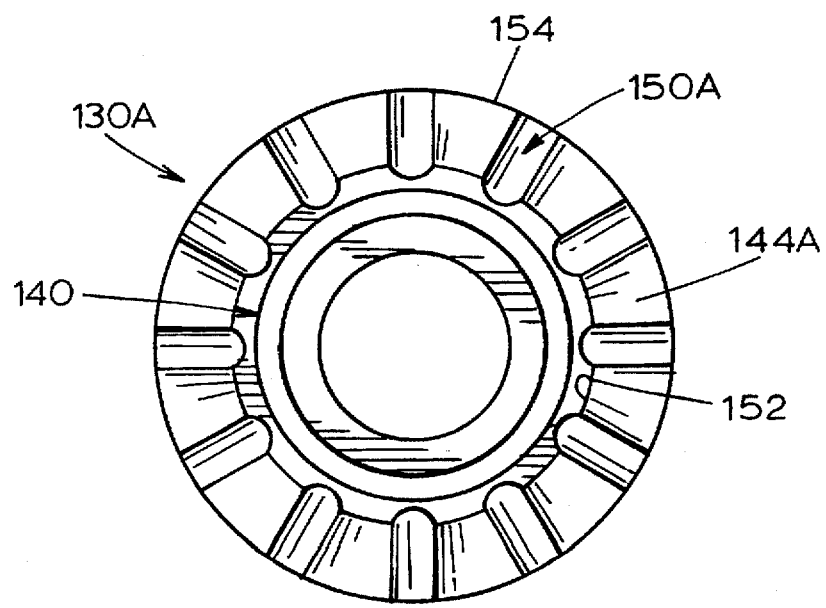
FIG. 2 is an enlarged bottom view of a smaller portion 130A of the adapter of FIG. 1 for lubrication of a relatively small wheel bearing.

As shown in FIGS. 1 and 1a, in the preferred embodiment, the adapter 130 is formed from two interfitting and separable parts 130A and 130B each having a plurality of radially extending grease passages 150A and 150B, respectively, in its outer surface. Each adapter part 130A and 130B includes an annular shoulder 172 and 174, respectively. The two interfitting parts 130A and 130B can be used together as shown in FIG. 1a, to lubricate a relatively large wheel bearing, e.g., having a 2.25 inch internal diameter, or the adapter part 130B can be separated from part 130A, using only part 130A to lubricate a relatively small wheel bearing, e.g., 1.625 inch internal diameter. When used together, as shown in FIG. 1a, shoulder 172 of base 144A of adapter part 130A seals against a lowermost, annular surface 176 of base 144B of adapter part 130B. Shoulder 174 seals against an annular undersurface 178 (FIG. 3) of wheel bearing 170 surrounding a wheel bearing central access opening 180. The grease flows along the concave upper piston surface 100, through the grease passages 150B and 150A in each adapter part 130B and 130A, respectively. The grease passages 150B in adapter part 130B communicate with the grease passages 150A in adapter part 130A through an annular peripheral surface groove 155 extending completely around an innermost portion of the upper surface 176 of the adapter portion 130B so that grease will flow as indicated by the arrows in FIG. 1a when the grease passages 150B and 150A are not in alignment along the outer surfaces of adapter parts 150B and 150A. The use of the adapter ensures that less excess grease is left on the upper surface of the piston after the wheel bearing is greased.

As shown in FIG. 3, the wheel bearing 170 is placed in greasing position over stem 120 on top of the adapter 130. This is done by disposing stem 120 through the wheel bearing central access opening 180 of the wheel bearing 170 to seal the cylindrical outer edge 190 of the outer, cylindrical wheel bearing member 185 against the upper, dished piston surface 100, when the apparatus is in operation. In addition, the adapter parts 130A and 130B include tubular or cylindrical nipples 135A and 135B, respectively (FIG. 1) integral with and extending upwardly from the tapered bases 144A and 144B, respectively. Nipple 135A fits within the tapered base 144B of adapter part 130B for use as shown in FIG. 1a; and nipple 135A fits within a central access opening 180 of a wheel bearing 170 for use without adapter part 130B. For example, nipple 135A of the adapter part 130A fits securely within the central wheel bearing access opening 180 of the wheel bearing 170. This creates a seal between the annular, upper surface 176 of base 144B of the adapter part 130B, and the inner surface 240 of the inner, cylindrical wheel bearing member 250.

The stem 120 further includes a plurality of grease-receiving passages 210 disposed at or near the dished upper surface 100 of piston 60 for the passage of grease from grease chamber 40 through the radial grooves 150 of the adapter 130 to the wheel bearing 170.

Grease holes 210 can be provided directly within piston 60 close to the stem 120 or, in accordance with another embodiment of the present invention, a grease passage 160 (FIG. 4) may be included within the threaded stem 120, for communicating grease from an undersurface 90 of piston 60 to the upper dished surface 100 of piston 60. The grease passage 160 extends along the axis of stem 120 and includes a transverse port or bore to provide fluid communication between the grease chamber 40 and the central access opening 180 of wheel bearing 170. Transverse bore 160 directs the grease toward wheel bearing 170 when the wheel bearing 170 is operatively disposed over the adapter 150 and sealed against the dished upper surface 100 of piston 60.

Figure 4:
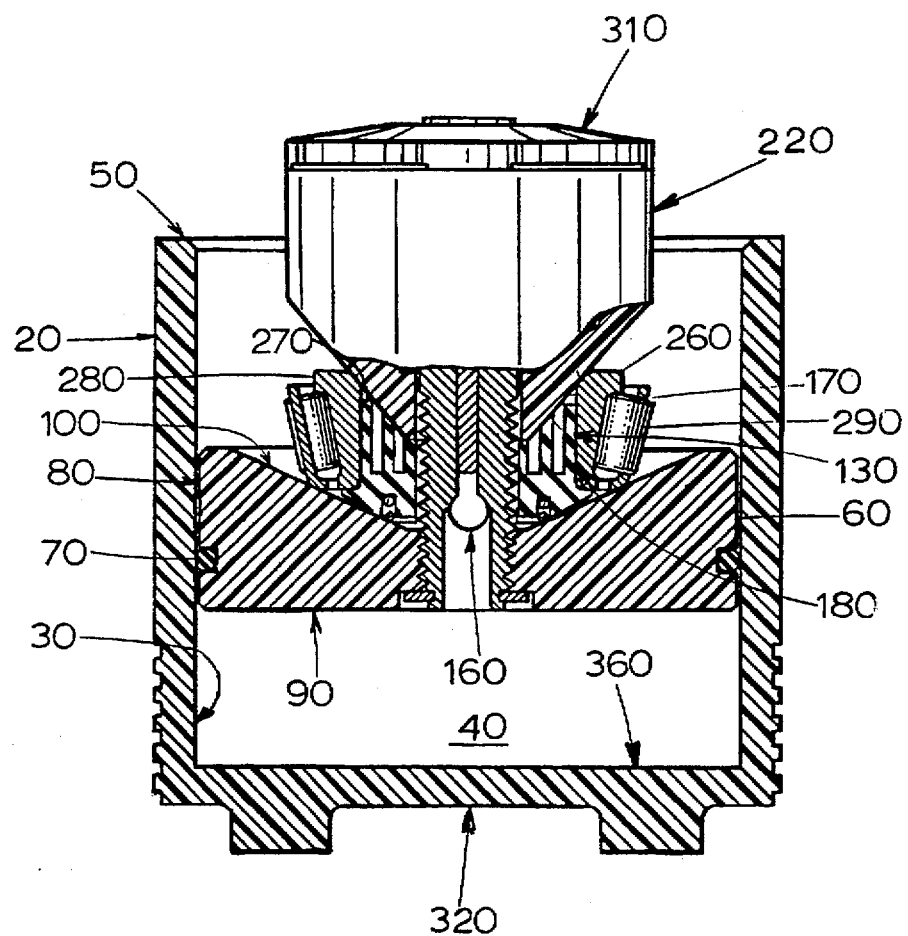
FIG. 4 is a cross-sectional view of the adapter operatively disposed within the preferred lubricating apparatus during lubrication of a wheel bearing.

The apparatus 10 further includes a spool 220 mounted over stem 120 and having a central, elongated, annular aperture 230 slightly larger in diameter than stem 120. The spool 220 can then be dropped over the stem 120, with wheel bearing 170 and adapter 130 in position, to seal the inner surface 240 of an inner, cylindrical wheel bearing member 250. The spool 220 includes a lower, conically tapered surface 260, having an included angle of 50–110 degrees, to provide a seal against an upper, inner periphery of the inner, cylindrical wheel bearing member 250 and the inner periphery of the adapter 130A. Seals created at the outer surface of the outer, cylindrical wheel bearing member 185 will cause grease emerging from bore 160 in the central access opening 180 of wheel bearing 170 to flow through an annular wheel bearing aperture 280, between rollers 290 (FIGS. 3 and 4).

The spool 220 further includes an extension member 300 mounted within central, elongated aperture 230 for adjusting the distance between an upper, load-bearing distal surface 310 of extension member 300, and a bottom load bearing edge 320 of housing 20. The upwardly extending surface 310 of spool extension member 300 can be adjusted to vary the distance, as needed, to assure that extension member load bearing distal surface 310 extends outwardly beyond the housing 20 so that an operator's hand(s) can force piston 60 into grease chamber 40.

In accordance with another embodiment of the present invention, the housing 20 can be made sufficiently short, or the spool 220 sufficiently long (while wide enough to receive an adequate quantity of grease) so that the spool extension member 300 is not needed. When the spool extension member is omitted, the spool preferably is made with a rounded end (not shown) for hand contact, similar to the rounded end surface 310 in extension member 300. When the spool extension member 300 is omitted, the spool 220 does not need internal threads in annular aperture 230. The spool 220 simply slides over the stem 120, as described.

OPERATION OF THE APPARATUS

Before greasing the wheel bearing 170, the grease chamber 40 is partially fried with grease. The piston 60 then is positioned within the open end 50 of the housing 20 and forced by hand downwardly against the grease in the grease chamber 40. The spool 220 is then positioned around the stem 120 and the piston 60 then is forced into the chamber 40 by applying hand pressure against extension member 310 until grease flows through openings 110 in upper piston surface 100. The spool 220 is then removed. The adapter 130 is then placed in the apparatus 10. The adapter 130 is placed over the stem 120 with its spring 140 placed in contact with the dished surface 100 of the piston 60. The wheel bearing 170 then is placed in greasing position over stem 120 on top of the adapter 130. The smaller diameter end 340 of spool 220 is placed around the stem 120 to seal the outer surface 190 of the outer, cylindrical wheel bearing member 185 against the concave upper surface 100 of the piston 60. The spool 220 then is positioned around the stem 120 until the conical spool surface 260 sealingly engages the inner periphery 240 of the inner, cylindrical wheel bearing member 250.

Once assembled in this configuration, the spool 220 is compressed against the wheel bearing by hand to compress the spring 140, thereby sealing the outer, convex surface of adapter base 144 of adapter 130 against the concave upper piston surface 100, and force lubricant through the aperture 110 in upper piston surface 100 and through the radial grooves 150 in the outer convex surface 144 of the adapter 130 until the wheel bearing is lubricated. Completion of bearing lubrication is evidenced by ribbons of grease emerging from between the annular slot 280 between inner, cylindrical wheel bearing member 250 and the outer, cylindrical wheel bearing member 185.

The inner and outer wheel bearing edges 190 and 240 sealingly engage the tapered spool surface 260 and the dished upper surface 100 of piston 60 when the spool 220 is compressed. Grease is forced into and around the individual rollers 290 of the wheel bearing 170 through the annular slot 280. The spool 300 is compressed until the operator of the apparatus 10 observes new grease being forced through the annular slot 280 of the wheel bearing 170 between rollers 290 as continuous ribbons of substantially equal length. The operator then is assured that the old grease has been forced out of the wheel bearing 170 and new grease has been injected in and around each roller 290.

After a number of wheel bearings have been greased and the housing 20 requires refiling, the piston 60 is abutting, or spaced only a slight distance from, the bottom surface of the grease chamber 40. The stem 120 is then threadedly attached to spool extension 300, as shown in FIG. 3a, to withdraw the piston 60 from the grease chamber 40. The attempted withdrawal of the piston 60 from the grease chamber 40 creates a vacuum within the grease chamber 40 between the closed surface 360 of grease chamber 40 and the lower surface 90 of piston 60, making it difficult to remove the piston 60 by hand. (See FIG. 4) In order to break this vacuum, a spring 340 extends from the undersurface of the piston 60 for compression against the bottom surface of the grease chamber 40. The grease chamber 40 may be filled with grease after piston 60 is removed to perform further repeated greasing or packing operations.

Obviously, many modifications and variations of the present invention are possible in light of the above teachings. Thus it is to be understood that, within the scope of the appended claims, the invention may be practiced other than as specifically described above.

What is claimed is:

1. In a device for lubricating a bearing including a housing for containing a lubricant, a movable piston adapted to be inserted into the housing in contact with said lubricant, said piston including an upper concave surface for communication of said lubricant with said bearing to be lubricated, said piston including a passage for flow of said lubricant, such that compression of said piston against said lubricant causes flow of said lubricant from below said piston to above said piston, the improvement comprising:

volume-filling means for filling a portion of a volume defined between said upper, concave piston surface and said bearing, said volume-filling means having an outer convex surface shaped complementary to the upper concave surface of said piston and disposed on said upper concave surface of said piston.

2. In the device of claim 1, wherein said outer convex surface of said volume-filling means is in the shape of a truncated cone, and includes lubricant flow means for allowing lubricant to flow from said upper concave piston surface to said bearing.

3. In the device of claim 2, wherein said volume-filling means includes an upstanding circular stem portion integral with said volume-filling means, said stem portion being adapted for insertion within an interior access opening of a wheel bearing.

4. In the device of claim 2, wherein said lubricant flow means comprises a plurality of grooves in an outer, piston-contacting surface of said volume-filling means, said grooves allowing lubricant to flow between said upper piston surface and said outer surface of said volume-filling means.

5. In the device of claim 1, wherein said volume-filling means includes an outer convex surface for contact of said volume-filling means against said upper piston surface.

6. In the device of claim 2, further including a spring integral with said truncated end of said volume-filling means for contact with and compression against said upper piston surface for sealing against an undersurface of the bearing.

7. In the device of claim 1, wherein the volume-filling means comprises inner and outer separable and interconnectable concentric portions, whereby an inner portion is used during lubrication of a relatively small wheel bearing, and whereby the inner portion is inserted within the outer portion during lubrication of a larger wheel bearing.

8. An apparatus for lubricating wheel bearings comprising:

a receptacle for containing a lubricant, said receptacle including a floor, a cylindrical wall extending upwardly from said floor, and an open top defined by an upper edge of said cylindrical wall;

a volume of lubricant contained within said receptacle;

a piston inserted into said receptacle from said open top, said piston disposed in contact with said lubricant and slidably mounted within said receptacle in sealing contact with an inner surface of said cylindrical wall, said piston including a passage for flow of said lubricant from an undersurface of said piston to an upper, concave surface of said piston when said piston is compressed against said lubricant;

means for compressing said piston against said lubricant; and, volume-filling means for filling a portion of a volume defined between said upper, concave piston surface and said wheel bearing, said volume-filling means disposed on said upper concave surface of said piston and including lubricant flow means for allowing lubricant to flow from said upper concave piston surface to said wheel bearing, said volume filling means having an outer convex surface shaped complementary to said concave upper piston surface for sealing contact of said volume filling means against said upper piston surface.

9. The apparatus of claim 8, wherein said outer surface of said volume-filling means is in the shape of a truncated cone.

10. The apparatus of claim 9, wherein said volume-filling means includes an upstanding circular stem portion integral with said volume-filling means, said stem portion being adapted for insertion within an interior access opening of a wheel bearing.

11. The apparatus of claim 9, wherein said lubricant flow means comprises a plurality of grooves in said upper concave surface of said volume-filling means, said grooves allowing said lubricant to flow between said upper piston surface and said outer surface of said volume-filling means.

12. The apparatus of claim 11, further including a spring integral with said truncated end of said volume-filling means for contact with and compression against said upper piston surface.

13. The apparatus of claim 11, wherein the volume-filling means comprises inner and outer separable and interconnectable concentric portions, whereby said inner portion is used during lubrication of a relatively small wheel bearing, and whereby the inner portion is inserted within the outer portion during lubrication of a larger wheel bearing.

14. The apparatus of claim 12, wherein said volume-filling means comprises a base portion having an outer surface in the shape of a truncated cone, said outer surface including a plurality of flow passages for flow of lubricant therethrough, said flow passages extending from a truncated innermost edge of said outer surface to an outer peripheral edge of said outer surface; and an integral annular shoulder extending inwardly from said outer peripheral edge of said outer surface of said base portion for sealing contact against said wheel bearing.

15. The apparatus of claim 14, wherein said volume-filling means further includes an upstanding annular stem potion, disposed perpendicular to sad annular shoulder, adapted for insertion within a central access opening in a wheel bearing.

16. In a method of applying a lubricant to a bearing comprising inserting said bearing into a lubricant chamber to seal an outer peripheral surface of said bearing against an upper frusto-conical surface of a piston member disposed within said lubricant chamber, the improvement comprising:

sealing an inner peripheral surface of said bearing by engaging a lower peripheral surface of said bearing against a tapered volume-filling means for filling a portion of a volume defined between said upper, frusto-conical surface of said piston and said wheel bearing, said volume-filling means having an outer convex surface shaped complementary to the upper surface of the piston member and disposed on said upper surface of said piston member;

compressing a compression member against an upper surface of said bearing to force said piston against lubricant held in said chamber so that said lubricant is forced upwardly into a lubricant receiving aperture in said piston, along an exterior, piston-contacting surface of said volume-filling means and into contact with said bearing.

* * * * *